(12) United States Patent
Havard

(10) Patent No.: US 7,191,945 B2
(45) Date of Patent: Mar. 20, 2007

(54) FRAUD-RESISTANT MERCHANDISE REDEMPTION COUPONS

(76) Inventor: Brian D. Havard, 11 Logan Pl., Rowayton, CT (US) 06853

( * ) Notice: Subject to any disclaimer, the term of this patent is extended or adjusted under 35 U.S.C. 154(b) by 108 days.

(21) Appl. No.: 10/968,194

(22) Filed: Oct. 19, 2004

(65) Prior Publication Data
US 2006/0081718 A1    Apr. 20, 2006

(51) Int. Cl.
*G06K 7/10* (2006.01)
(52) U.S. Cl. ............. 235/462.01; 235/487; 235/494; 283/51
(58) Field of Classification Search ............ 235/494; 283/51, 54
See application file for complete search history.

(56) References Cited

U.S. PATENT DOCUMENTS 5,087,507 A * 2/1992 Heinzer ............ 428/195.1
5,488,423 A * 1/1996 Walkingshaw et al. ...... 725/24
5,830,609 A * 11/1998 Warner et al. ............... 430/10

* cited by examiner

*Primary Examiner*—Seung Ho Lee

(57) ABSTRACT

A copy-resistant coupon including a human-readable section with text formed by reflective areas and dark-colored areas, and a machine-readable bar code section composed of reflective bars appearing in a light-colored background. Photosensitive devices used in copiers and bar code scanners interpret the reflective areas as dark, such that the reflective bars in the bar code stand out as dark in high contrast to their light-colored background, and are easily readable by the bar code scanner, while the human-readable section when copied will show reflective areas and dark-colored areas both as dark with little or no contrast between them and revealing that copying has taken place. The coupons are made with printing methods that apply dark- and light-colored inks to metallicized paper, or apply metallic inks to dark- or light-colored surfaces of papers.

19 Claims, 5 Drawing Sheets

FRAUD-RESISTANT MERCHANDISE REDEMPTION COUPONS

FIELD OF THE INVENTION

The present invention generally relates to retail merchandise discount coupons, and more particularly to a coupon structure and a method for making coupons that provides coupons that are resistant to fraudulent copying and redemption.

BACKGROUND OF THE INVENTION

In the marketing of retail products, e.g., at supermarkets, merchandisers often promote sales with discount coupons, often referred to as "cents off" coupons, that are redeemed at the point of sale by the customer. The coupons have a human readable section that contains, e.g., the name of the product, the amount of the discount, expiration date, and any other terms and conditions for use. The coupons also have a bar code section readable by a bar code reader with similar information that can be scanned and processed by a store's checkout software to perform tasks such as: verify the product is actually being purchased, automatically process the discount, tally the resulting discounted cost on the customer's bill, and provide a record, by manufacturer, of the discounts processed by the store. The store in effect advances the amount of the coupon discount to the customer on behalf of the manufacturer, and the manufacturer is obligated to reimburse the store for the advances, plus a handling fee.

Once redeemed by the store, it is customary for the coupons to be forwarded in bulk to a clearing house or redemption house that automatically scans the coupon bar codes, totals the individual coupons and arranges for appropriate transfers of funds from coupon-issuing manufacturers to coupon-redeeming stores.

A problem has arisen in that as coupon values have increased, customers or retailers (and organized crime) have found it lucrative to fraudulently copy legitimate coupons and redeem the fraudulent copies. Such copies are typically made with color photocopiers, or with scanned images printed on a color printer. Because of the quality of modern reproduction devices, it often is difficult to distinguish such copies from originals. Manufacturers have grounds to object when counterfeit coupons are redeemed, either because their marketing plans are intended to provide a limited incentive through discounts, or in a limited geographical area, or because the redeemed coupons do not represent actual sales.

Accordingly, there is a need to provide a coupon that is resistant to fraudulent copying and redemption. In the past, anti-counterfeiting measures have been devised for checks, currency or securities that rely on holographic images, or the use of watermarked "security paper", on diffraction gratings, or on other techniques to thwart copying. However, because merchandise coupons have relatively little value, the cost of these known techniques has proven too great for them to be employed, and often they limit the graphic advertising designs that manufacturers would like to put on their coupons. Moreover, the coupons need to be accurately scanned by bar code readers which use optical devices similar to those found on copiers and bar code reading can be interfered with by some anti-copying techniques. There remains a need to provide a coupon structure and coupon-making method that allows copy-resistant coupons to be made simply and economically, without detracting from the appearance of the coupons, and at the same time permitting bar code scanning to take place without interference.

BRIEF SUMMARY OF THE INVENTION

Briefly, the present invention in one aspect includes a copy-resistant coupon feature. The copy-resistant feature includes a structure and method that provides a human-readable section composed of reflective areas and dark-colored areas, and a machine-readable bar code section composed of reflective bars in a light-colored background. Photosensitive devices used both in copiers and bar code scanners interpret the reflective areas as "dark", which means that the reflective bars in the bar code stand out as "dark" in high contrast to their light-colored background, and are easily readable by the bar code scanner, while the human-readable section when copied will show reflective areas and dark-colored areas both as "dark" with little or no contrast between them and plainly revealing that copying has taken place.

In a first aspect of the invention, the coupon has a sheet (such as metallized paper stock) with a reflective surface, a dark-colored covering (such as blue or black ink) over the reflective surface in the human-readable section and forming the text of the human-readable section either as negative or positive images, and a light-colored covering (such as white ink) over the reflective surface in the bar code section and forming the bars as a negative image (i.e., with the bars formed by the reflective background surface surrounded by the light-colored covering).

In another aspect of the invention, the coupon has a sheet forming a dark-colored background in the human-readable section, a light-colored background in the bar code section (which may itself be a light-colored covering over a dark-colored background), and a reflective covering (such as metallic ink) forming the text of the human-readable section either as negative or positive images, and forming the bars in the bar code section as a positive images (i.e., the bars are formed by the reflective covering).

In another aspect of the invention, a method provides for making copy-resistant coupons. In accordance with the method, a coupon is formed by applying or depositing (e.g., with customary printing techniques) two sections on a sheet. A first section forms a human-readable section composed of reflective areas and dark-colored areas defining text, and a second section forms a bar code section composed of reflective bars on a light-colored background and defining machine-readable bar codes.

In another aspect of the invention, the method for making copy-resistant coupons provides a reflective sheet, prints the first image on the reflective sheet with dark-colored ink to form the human-readable section composed of reflective areas and dark-colored areas defining text, and prints the second image on the reflective sheet with light-colored ink to form the bar code section composed of reflective bars on a light-colored background and defining machine-readable bar codes.

In still another aspect of the invention, the method of making copy-resistant coupons provides a non-reflective sheet with dark-colored and light-colored sections, and prints reflective ink on the non-reflective sheet to form the human-readable section composed of reflective areas on dark-colored areas defining text, and to the form the bar code section composed of reflective bars on a light-colored background and defining machine-readable bar codes.

The present invention has several advantages. It enables a coupon to be created that is both copy-resistant and capable of having bar codes read by usual bar code scanners. Moreover, it enables a coupon to be created that allows copying to be easily detected. In addition, a copy-resistant coupon can be created that permits customary graphic designs to be used. Another advantage includes enabling a copy-resistant coupon to be created inexpensively. Still other advantages include enabling a copy-resistant coupon to be created using available printing paper stocks and inks and conventional printing techniques.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
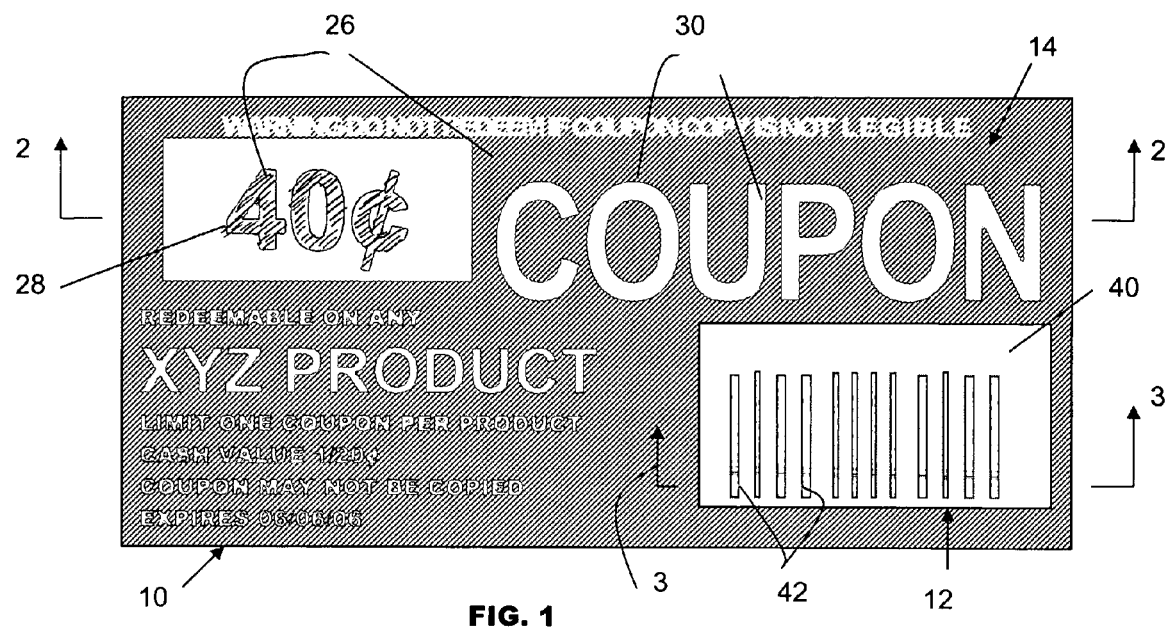
FIG. 1 is a front view of a coupon according to the invention.
Figure 2:
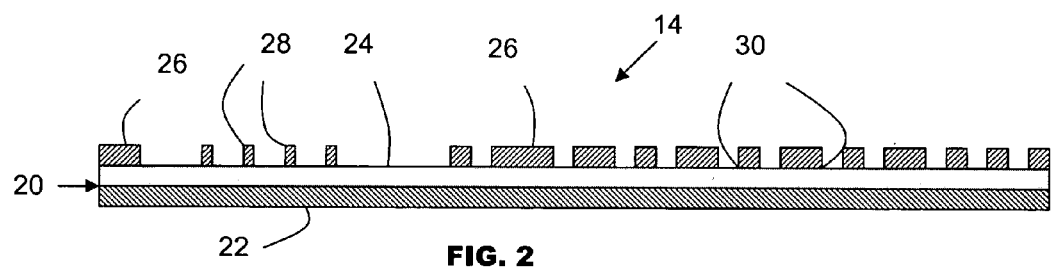
FIG. 2 is a section along lines 2—2 of FIG. 1 with a greatly expanded vertical scale for illustrative purposes.

FIG. 1 illustrates a coupon 10 in accordance with the invention with a rectangular bar code region 12 and a human readable text portion 14. As shown in FIGS. 1 and 2, the coupon 10 is formed on a sheet 20 with a backing layer 22 and a metallized coating layer 24 which provides a reflective surface.

The human readable text portion 14 is formed with a dark-colored covering 26 which either forms positive image characters 28 (shown in FIG. 1 by the text "40¢") by covering the reflective surface of metallized layer 24 with the character shapes or negative image characters 30 (shown in FIG. 1 by the text "COUPON") by covering areas of the reflective surface of metallized layer 24 that surround the character shapes. The backing layer 22 and metallized coating layer 24 advantageously are an aluminized paper product such as Vacumet Metallized Paper marketed by Vacumet Corporation. The dark-colored covering is advantageously a dark-colored ink, for example, blue or black, such as the translucent gun metal blue ink marketed by Superior Ink Corp. The sheet 20 may have other constructions, for example instead of the laminated structure illustrated in FIGS. 2 and 3, the sheet 20 may be a homogeneous layer of materials providing a reflective surface, such as a metal foil, or a matrix carrying metallic particles. While a metal foil may have handling properties that are not optimal for many stand-alone coupon applications, a foil can be adhered to other materials, such as the paper or plastic wrapping for a product. Additionally, the metallized coating 24 may itself have a transparent coating, e.g., a plastic film, to prevent corrosion or to enhance printability or handling, or to supply a green, gold, copper or brass or other shade of tint.

Figure 3:
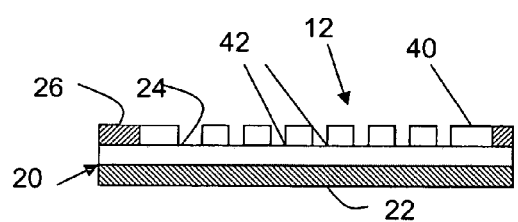
FIG. 3 is a section along lines 3—3 of FIG. 1 with a greatly expanded vertical scale for illustrative purposes.

As shown in FIG. 3, the scannable bar code region 12 is formed with a light-colored covering 40 which forms the bars 42 of the bar code as a negative image, i.e., the bars 42 are formed by areas of the reflective surface of metallized layer 24 visible between areas of the light-colored covering 40. The light-colored covering is advantageously a light-colored ink, for example, the opaque white ink marketed by Superior Ink Corp. The bars 42 are sized and spatially arranged in accordance with well-known bar coding standards, such as the coding standards known as the UPC Code Standards of the Uniform Code Council, Dayton, Ohio, www.uc-council.org, to contain the information needed to process the coupon 10, such as the amount of the discount, the expiration date, the name of the manufacturer offering the discount, and the product or products for which the coupon is valid.

Figure 9:
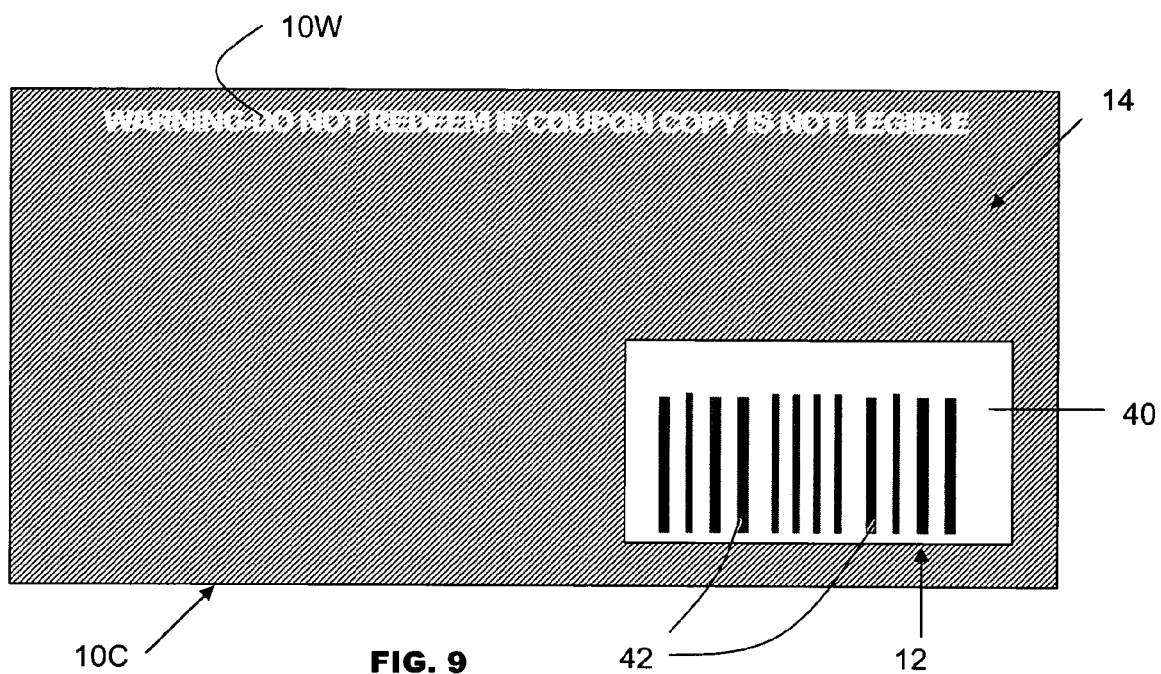
FIG. 9 is a front view of a photocopy of the coupon of FIGS. 1–3.

When the coupon 10 is copied by a conventional photocopier or reproduced with a scanner-printer combination, the copy 10C shown in FIG. 9 results. Conventional photocopiers and scanner-printer combinations reproduce the light-colored covering 40 as a light color on the copy, but do not reproduce the shiny appearance of reflective metallized areas, and it has been discovered that in addition they cause the reflective areas provided by the metallized coating 24 to be reproduced as "dark" areas on the copy. As a result the bar code section 12 is reproduced as dark-colored bars on a light background (which means the bars stand out in high contrast and will be accurately scanned with usual photosensitive bar code scanners). In the human-readable text sections 14, however, both the reflective areas and the dark-colored covering 26 reproduce as "dark" areas on the copy 10C. Accordingly, the human readable text section 14 has no contrast as shown in FIG. 9, or has very little contrast depending on the copiers used, with the result that the text becomes substantially illegible and the fact that an illicit copy has been attempted is vividly displayed. Ink colors and properties can be selected together with reflective properties of layer 24 to provide the appropriate degree of lost contrast. Because the human readable section is essentially all dark, store clerks easily detect the counterfeit coupons and are instructed to decline to accept them. Likewise, a clearing or redemption house to which coupons are sent for bulk processing can easily detect the existence of counterfeit coupons and decline to honor them. If desired, a warning 10W such as "WARNING: DO NOT REDEEM IF COUPON COPY IS NOT LEGIBLE" can be placed on the coupon to draw the clerk's attention to the problem, and such a warning can be supplied in a color that will survive reproduction well and stand out on the copy 10C, such as the light-colored ink 40 used to form the background in the bar code section 12.

Figure 7:
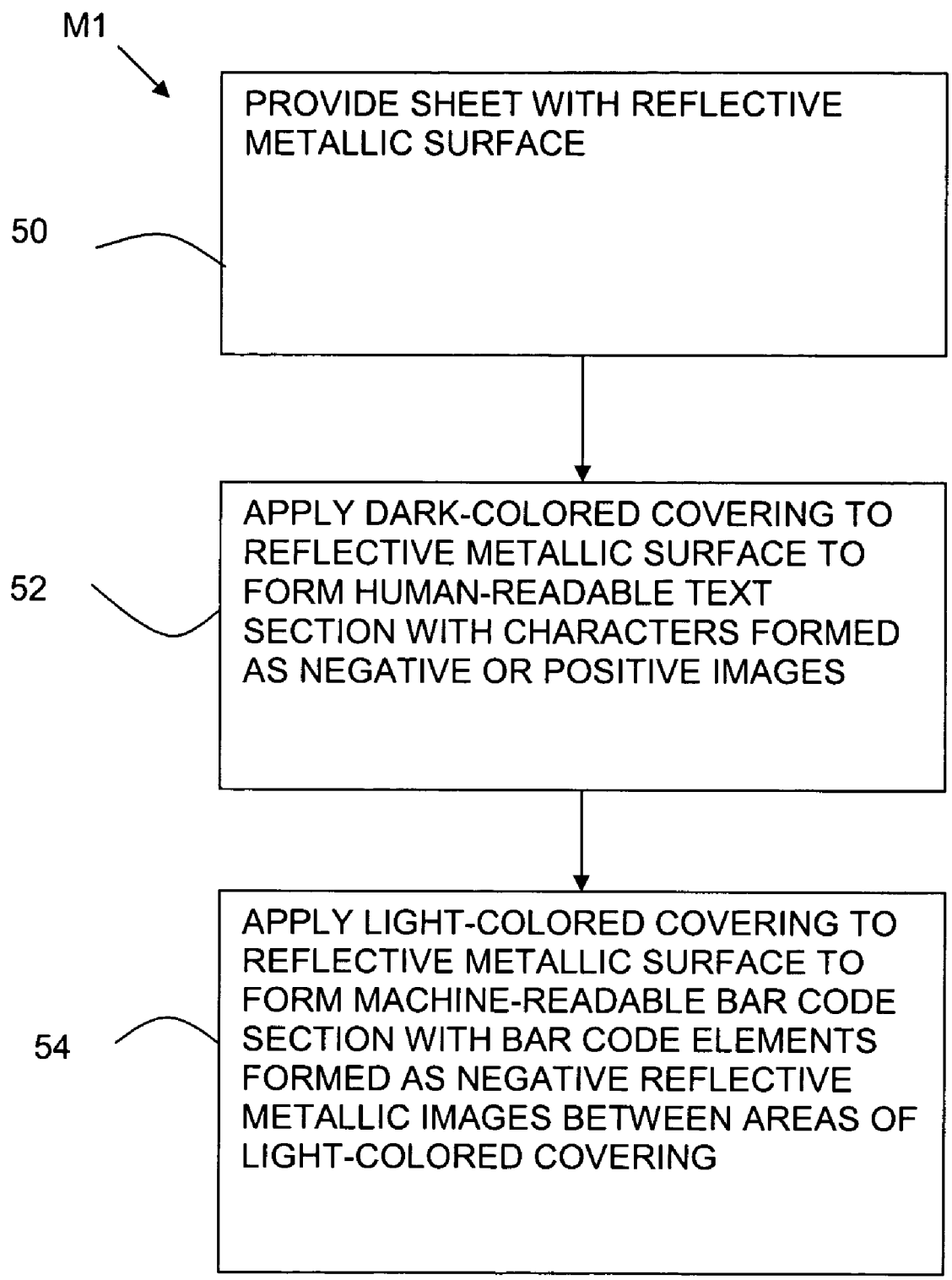
FIG. 7 is a schematic diagram of a method for making the coupon of FIG. 1.

FIG. 7 illustrates schematically a method M1 for making the coupon 10 illustrated in FIGS. 1–3. As shown in FIG. 7, in step 50 a sheet with a reflective surface, such as sheet 20, is provided. In step 52, a dark-colored covering 26 is applied to the sheet to form the human-readable text section 14 with characters appearing as negative or positive images. Step 52 may be accomplished by applying the dark-colored covering as blue or black printers ink using conventional printing processes such as continuous sheet printing. In step 54, a light-colored covering 40 is applied to the sheet 20 to form the bar-code section 12 with the bars 42 appearing as negative images. Step 54 may also be accomplished by applying printers ink using conventional printing processes. Step 54 may be performed either after step 52 or before, or the two steps may be performed simultaneously. In accordance with conventional coupon manufacturing practice, the coupons may then be cut into individual units if printed on a continuous sheet, and stacked and packaged. At the conclusion of method M1, a copy-resistant coupon has been created simply and inexpensively.

Figure 4:
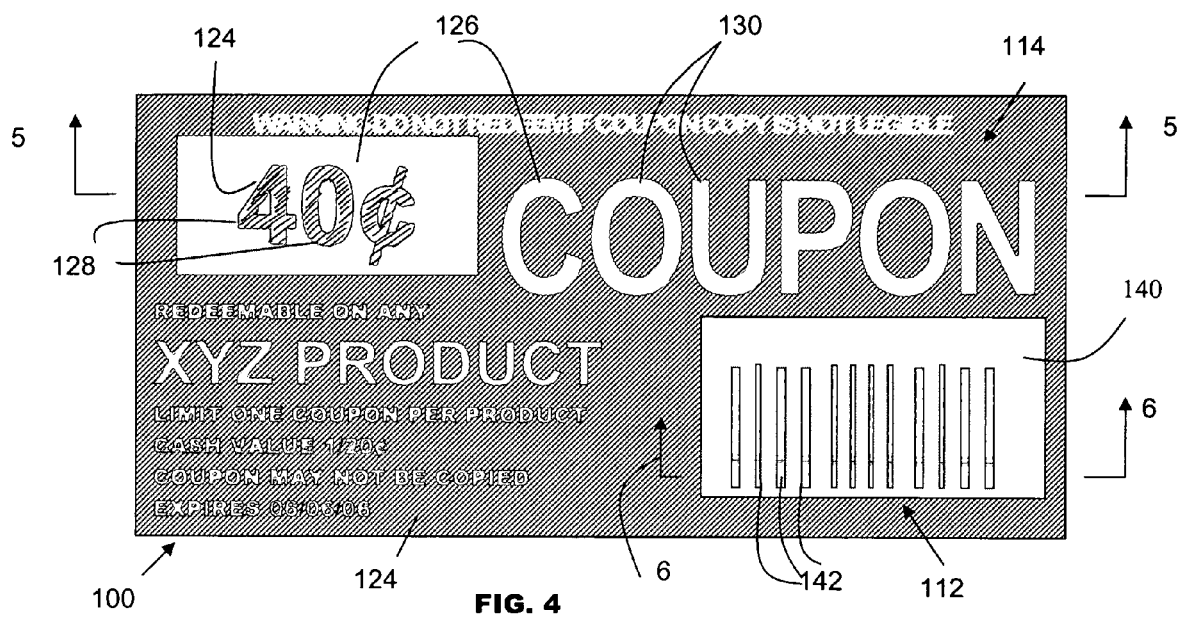
FIG. 4 is a front view of another embodiment of the invention.
Figure 5:
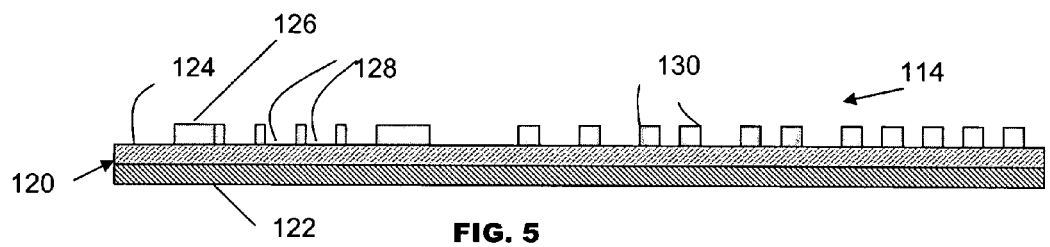
FIG. 5 is a section along lines 5—5 of FIG. 4 with a greatly expanded vertical scale for illustrative purposes.
Figure 6:
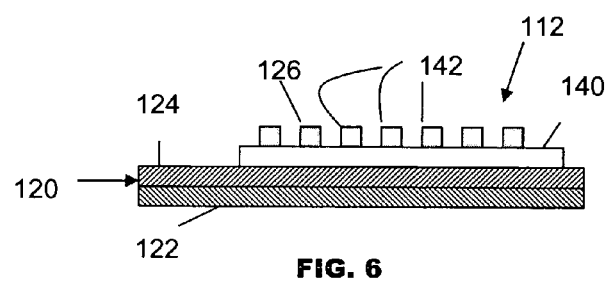
FIG. 6 is a section along lines 6—6 of FIG. 4 with a greatly expanded vertical scale for illustrative purposes.

FIGS. 4–6 illustrate another embodiment of the invention in which copy-resistant coupon 100 has a rectangular bar code region 112 and a human readable text portion 114. As shown in FIGS. 4 and 5, the coupon 100 is formed on a sheet 120 with a backing layer 122 and a dark-colored layer 124.

The human readable text portion 114 is formed with a reflective covering 126 which either forms negative image characters 128 (shown by the text "40¢") on the dark-colored layer 124 by covering areas of the layer 124 that surround the characters or positive image characters 130 (shown by the text "COUPON"). The backing layer 122 and dark-colored layer 124 advantageously are formed as a laminated paper product. The reflective covering 126 is advantageously a reflective ink, for example, a metallic ink, of which many commercial examples exist. The sheet 120 may have other constructions, for example instead of the laminated structure illustrated, the sheet 120 may be a homogeneous layer of materials providing a dark-colored surface, such as simple paper stock, or may be a light-colored sheet of paper with dark-colored ink applied in the human readable section 114. Additionally, the reflective metallized ink or coating 126 may itself have a transparent coating (not shown) to prevent corrosion or to enhance usability or to provide a desired tint.

As shown in FIG. 6, the scannable bar code region 12 is formed with a light-colored covering 140 on sheet 120 and a reflective covering 126 which forms the bars 142 of the bar code as a positive image, i.e., the bars 140 are formed by areas of the reflective covering 126 between areas of the light-colored covering 140. The light-colored covering is advantageously a light-colored ink, for example, the opaque white ink marketed by Superior Ink Corp. The bars 142 are sized and spatially arranged in accordance with bar coding standards, such as the coding standards provided by the Uniform Code Counsel of Dayton, Ohio, to contain the information needed to process the coupon 100, such as the amount of the discount, the expiration date, the name of the manufacturer offering the discount, and the product or products for which the coupon is valid. If the sheet 120 is a light-colored sheet of paper as suggested in the previous paragraph, the light colored covering 140 is provided by the surface of the sheet.

When the coupon 100 is copied by a conventional photocopier or reproduced with a scanner-printer combination, the copy again is similar to the copy 10C shown in FIG. 9. Conventional photocopiers and scanner-printer combinations reproduce the light-colored covering 140 as a light color on the copy, and reproduce the reflective areas provided by the metallized coating 126 as "dark" areas on the copy. As a result the bar code section 112 is reproduced as dark-colored bars 142 on a light background (which means the bars stand out in high contrast and will be accurately scanned with usual photosensitive bar code scanners). In the human-readable text sections 114, however, both the reflective areas 126 and the dark-colored layer 124 reproduce as "dark" areas on the copy. Accordingly, the human readable text section 114 has no contrast as shown in FIG. 9, or has very little contrast depending on the copiers used, with the result that the text becomes substantially illegible and the fact that an illicit copy has been attempted is vividly displayed. Store clerks easily detect the counterfeit coupons. Likewise, a clearing or redemption house to which coupons are sent for bulk processing can easily detect the existence of counterfeit coupons and decline to honor them. If desired on coupon 100, a warning such as warning 10W shown in FIG. 9 reading "WARNING: DO NOT REDEEM IF COUPON COPY IS NOT LEGIBLE" can be placed on the coupon to draw the clerk's attention to the problem, and such a warning can be supplied in a color that will survive reproduction well and stand out on the copy 10C, such as the light-colored ink 140 used in the bar code section 112.

Figure 8:
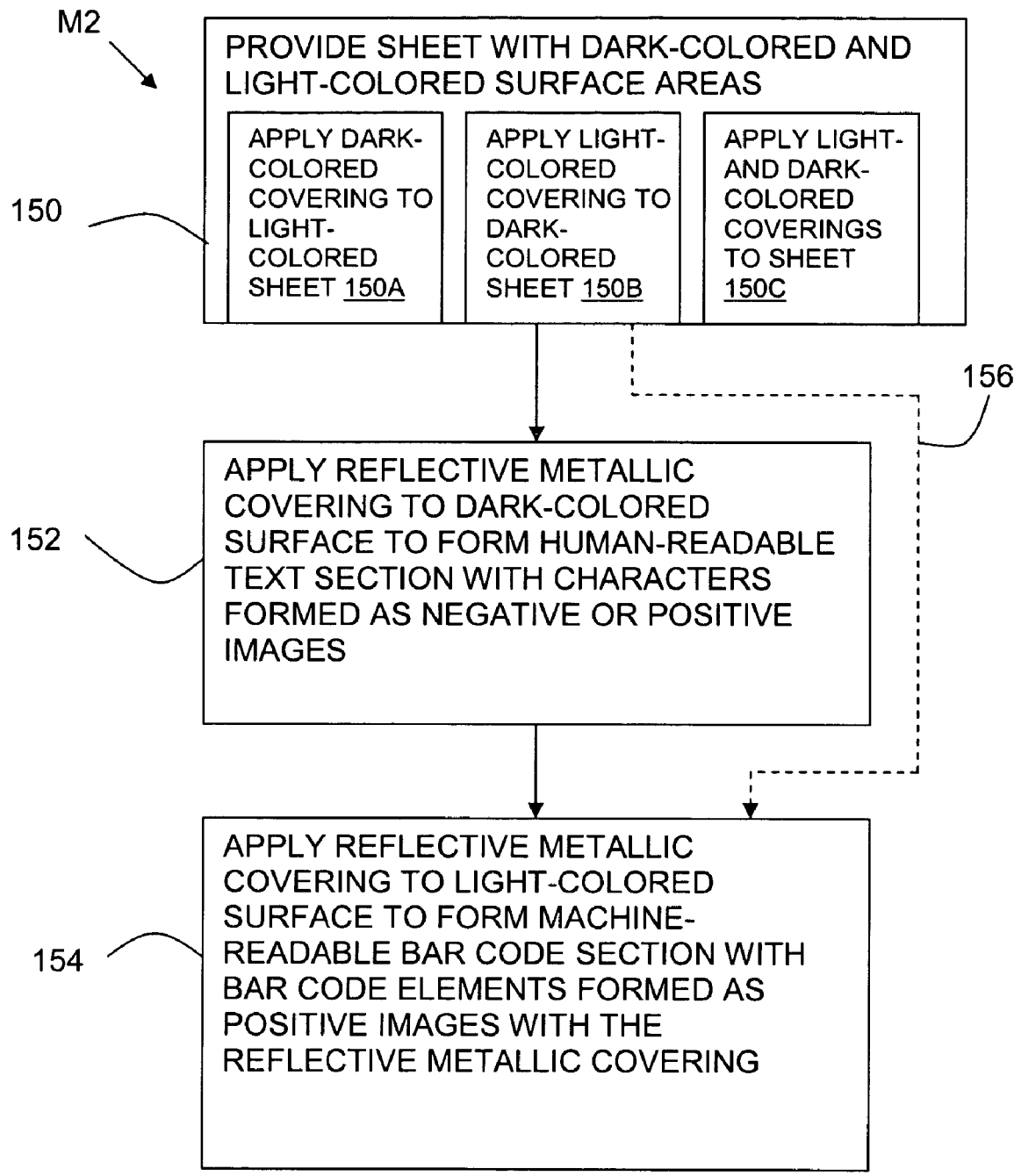
FIG. 8 is a schematic diagram of a method for making the coupon of FIG. 4.

FIG. 8 illustrates schematically a method M2 for making the coupon 100 illustrated in FIGS. 4–6. As shown in FIG. 8, in step 150 a sheet is supplied with a dark-colored surface area 124 and a light-colored surface area 140. In step 152, the reflective covering 126 is applied to the dark-colored areas 126 of the sheet to form the human-readable text section 114 with characters appearing as negative or positive images. Step 152 may be accomplished by applying the reflective covering 126 as reflective metallic printers ink using conventional printing processes such as continuous sheet printing. In step 154, the reflective covering 126 is applied to the light-colored surface 140 of the sheet 110 to form the bar-code section 112 with the bars 142 appearing as positive images. Step 154 also may be accomplished by applying metallic printers ink using conventional printing processes. Step 154 may be performed either after step 152 or before, or the two steps may be performed simultaneously as indicated by dashed arrow 156 in FIG. 8. In step 150, the light-colored surface 140 may be supplied by applying a light-colored covering such as a white ink to a dark-colored surface 124, or if the sheet 120 is itself light colored, then the dark-colored surface may be supplied by applying a dark-colored covering such as blue or black ink to the sheet 120. Alternatively, both light-colored and dark-colored coverings may be applied to a backing sheet of arbitrary color to form the light- and dark-colored surfaces areas. These three alternatives are shown as blocks 150a, 150b and 150c within block 150 in FIG. 8. In accordance with conventional coupon manufacturing practice, after steps 150, 152 and 154, the coupons may then be cut into individual units if printed on a continuous sheet, and stacked and packaged. At the conclusion of method M2, a copy-resistant coupon has been created simply and inexpensively.

Thus, a copy-resistant feature for merchandise coupons has been described. The copy-resistant feature includes a structure and method. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Different materials may be used than that shown and suggested that may comprise other implementations of the present invention. For example, all of the light-colored, dark-colored and reflective metallic surfaces may be supplied by deposition processes other than those described, and may be supplied as separate non-overlapping regions on a background that is unrelated to any of these surfaces. Therefore, it is intended that the invention not be limited to the particular embodiments disclosed, but that the invention include all embodiments falling within the scope of the appended claims. All United States patents or patent applications cited herein should be deemed to be incorporated by reference as to their entire contents.

What is claimed is:

1. A copy-resistant coupon comprising
a human-readable section with text formed by reflective areas and dark-colored areas, and
a machine-readable bar code section composed of reflective bars appearing in a light-colored background,
whereby photosensitive devices used in copiers and bar code scanners interpret the reflective areas as dark, such that the reflective bars in the bar code stand out as dark in high contrast to their light-colored background, and are easily readable by the bar code scanner, while the human-readable section when copied will show reflective areas and dark-colored areas both as dark with little or no contrast between them and revealing that copying has taken place.

2. A copy-resistant coupon as claimed in claim 1 wherein the coupon comprises a sheet with a reflective surface, the dark-colored areas in the human-readable section are formed with a dark-colored covering on the reflective surface, and the light-colored areas in the machine-readable bar code section are formed with a light-colored covering on the reflective surface.

3. A copy-resistant coupon as claimed in claim 2 wherein the sheet with a reflective surface is a metallized paper.

4. A copy-resistant coupon as claimed in claim 2 wherein the dark-colored covering is a dark-colored ink deposited on the sheet.

5. A copy-resistant coupon as claimed in claim 2 wherein the light-colored covering is a light-colored ink deposited on the sheet.

6. A copy-resistant coupon as claimed in claim 1 wherein the coupon comprises a sheet, and the reflective areas in the human-readable section and the reflective bars in the machine-readable bar code section are formed with a reflective covering on the sheet.

7. A copy-resistant coupon as claimed in claim 6 wherein the reflective covering is a metallic ink deposited on the sheet.

8. A copy-resistant coupon as claimed in claim 6 wherein the dark-colored areas in the human-readable section are formed with a dark-colored covering on the sheet.

9. A copy-resistant coupon as claimed in claim 7 wherein the dark-colored covering is a dark-colored ink deposited on the sheet.

10. A copy-resistant coupon as claimed in claim 6 wherein the light-colored areas in the machine-readable bar code section are formed with a light-colored covering on the sheet.

11. A copy-resistant coupon as claimed in claim 10 wherein the light-colored covering is a light-colored ink deposited on the sheet.

12. A copy-resistant coupon as claimed in claim 1 wherein the coupon comprises a metallized paper sheet with a reflective surface, the dark-colored areas in the human-readable section are formed with a dark-colored ink deposited on the reflective surface, and the light-colored areas in the machine-readable bar code section are formed with a light-colored ink deposited on the reflective surface.

13. A copy-resistant coupon as claimed in claim 1 wherein the coupon comprises a sheet, and the reflective areas in the human-readable section and the reflective bars in the machine-readable bar code section are formed with a metallic ink deposited on the sheet and the dark-colored areas in the human-readable section are formed with a dark-colored ink deposited on the sheet and the light-colored areas in the machine-readable bar code section are formed with a light-colored ink deposited on the sheet.

14. A method for making a copy-resistant coupon comprising
providing a sheet with a reflective metallic surface;
applying a dark-colored covering on the reflective metallic surface to form a human-readable section with text characters defined by the dark-colored covering and the reflective metallic surface; and
applying a light-colored covering on the reflective metallic surface to form a machine-readable bar code section with reflective bar code elements surrounded by the light-colored covering;
whereby photosensitive devices used in copiers and bar code scanners interpret the reflective areas as dark, such that the reflective bars in the bar code stand out as dark in high contrast to their light-colored background, and are easily readable by the bar code scanner, while the human-readable section when copied will show reflective areas and dark-colored areas defining the text both as dark with little or no contrast between them and revealing that copying has taken place.

15. The method of claim 14, wherein the step of applying a dark-colored covering comprises depositing a dark-colored ink.

16. The method of claim 14, wherein the step of applying a light-colored covering comprises depositing a light-colored ink.

17. A method for making a copy-resistant coupon comprising
providing a sheet with a surface having a dark-colored area and a light-colored area;
applying a reflective metallic covering on the dark-colored area of the sheet to form a human-readable section with text characters defined by the dark-colored area and the reflective metallic covering; and
applying a reflective metallic covering on the light-colored area of the sheet to form a machine-readable bar code section with reflective bar code elements defined by the reflective metallic covering and surrounded by the light-colored area;
whereby photosensitive devices used in copiers and bar code scanners interpret the reflective areas as dark, such that the reflective bars in the bar code stand out as dark in high contrast to their light-colored background, and are easily readable by the bar code scanner, while the human-readable section when copied will show reflective areas and dark-colored areas defining the text both as dark with little or no contrast between them and revealing that copying has taken place.

18. The method of claim 17, wherein the step of providing a sheet with a dark-colored area and a light-colored area comprises providing a sheet with a light-colored surface and applying a dark-colored covering to the light-colored surface to form the dark-colored area.

19. The method of claim 17, wherein the step of providing a sheet with a dark-colored area and a light-colored area comprises providing a sheet with a dark-colored surface and applying a light-colored covering to the dark-colored surface to form the light-colored area.

* * * * *